United States Patent
Allen et al.

(10) Patent No.: US 9,563,972 B2
(45) Date of Patent: Feb. 7, 2017

(54) METHODS AND APPARATUS FOR PROVIDING COLOR PALETTE MANAGEMENT WITHIN A GRAPHICAL USER INTERFACE

(71) Applicant: FiftyThree, Inc., New York, NY (US)

(72) Inventors: Andrew S. Allen, Norwalk, CT (US); Charles Matthew Chen, Brooklyn, NY (US); Julian Reid Walker, Jersey City, NJ (US); Amit Pitaru, Brooklyn, NY (US)

(73) Assignee: FifthyThree, Inc., New York, NY (US)

( * ) Notice: Subject to any disclaimer, the term of this patent is extended or adjusted under 35 U.S.C. 154(b) by 34 days.

(21) Appl. No.: 14/060,101

(22) Filed: Oct. 22, 2013

(65) Prior Publication Data

US 2014/0111539 A1    Apr. 24, 2014

Related U.S. Application Data

(60) Provisional application No. 61/717,016, filed on Oct. 22, 2012.

(51) Int. Cl.
*G06T 11/00* (2006.01)
*G06F 3/0488* (2013.01)
*G06F 3/0484* (2013.01)

(52) U.S. Cl.
CPC ........... *G06T 11/001* (2013.01); *G06F 3/0488* (2013.01); *G06F 3/04847* (2013.01)

(58) Field of Classification Search
None
See application file for complete search history.

(56) References Cited

U.S. PATENT DOCUMENTS

| 5,420,607 A | * | 5/1995 | Miller et al. | 345/156 |
| 5,552,805 A | * | 9/1996 | Alpher | G06T 11/001 345/597 |
| 6,121,976 A | * | 9/2000 | Lu | G06T 11/001 345/426 |
| 6,879,327 B1 | * | 4/2005 | Mathur | G06T 11/40 345/589 |

(Continued)

OTHER PUBLICATIONS

Extended Search Report for European Patent Application No. 13189721.7, mailed Sep. 24, 2015.

*Primary Examiner* — Barry Drennan
*Assistant Examiner* — Jason Pringle-Parker
(74) *Attorney, Agent, or Firm* — Stoel Rives LLP

(57) ABSTRACT

A method is provided that comprises receiving, from a user device, a first input indicating a first color, from a color palette, as a source color. The method further comprises receiving, from the user device, a second input indicating a second color from the color palette as a target color. The method also comprises receiving, from the user device, a plurality of user movement indicators representing an incremental mixing of the target color into the source color. The method further comprises defining a plurality of colors based on the first input, the second input and the plurality of user movement indicators. The method also comprises storing, data associated with each color from the plurality of colors. The method further comprises sending, for each color from the plurality of colors, a signal to display a representation of that color on the user interface associated with the user device.

20 Claims, 9 Drawing Sheets
(5 of 9 Drawing Sheet(s) Filed in Color)

(56) References Cited

U.S. PATENT DOCUMENTS

| | | | |
|---|---|---|---|
| 6,914,602 B2* | 7/2005 | Kaskel | G06T 5/009 345/419 |
| 7,136,074 B2* | 11/2006 | Hussie | 345/591 |
| 7,180,524 B1* | 2/2007 | Axelrod | G01J 3/522 345/593 |
| 7,408,673 B1* | 8/2008 | Chinn | G01J 3/02 345/593 |
| 8,013,869 B2* | 9/2011 | Voliter et al. | 345/591 |
| 8,077,931 B1* | 12/2011 | Chatman | G06T 7/0012 382/118 |
| 2003/0033514 A1* | 2/2003 | Appleby-Allis | G06F 15/7867 713/100 |
| 2003/0117408 A1* | 6/2003 | Forsline | G06F 3/03545 345/581 |
| 2003/0174882 A1* | 9/2003 | Turpin | G06F 3/0481 382/162 |
| 2007/0088729 A1* | 4/2007 | Baca | G06F 9/4443 |
| 2007/0184415 A1* | 8/2007 | Sasaki | A45D 44/005 434/100 |
| 2007/0229861 A1* | 10/2007 | Forbush et al. | 358/1.9 |
| 2009/0021524 A1* | 1/2009 | Lenart-Weary | G01J 3/528 345/593 |
| 2009/0204913 A1* | 8/2009 | Kawano | H04N 1/6011 715/762 |
| 2009/0231356 A1* | 9/2009 | Barnes | G06F 3/0482 345/594 |
| 2011/0292069 A1* | 12/2011 | Witt | H04N 1/6011 345/590 |
| 2012/0054665 A1* | 3/2012 | Kano et al. | 715/776 |
| 2013/0132905 A1* | 5/2013 | Moskalonek et al. | 715/835 |

* cited by examiner

300

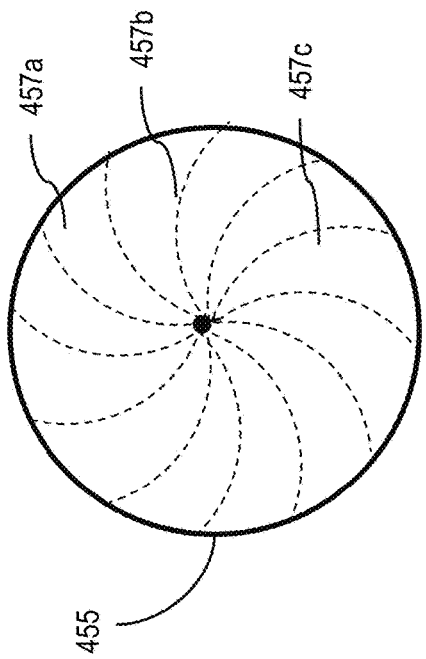
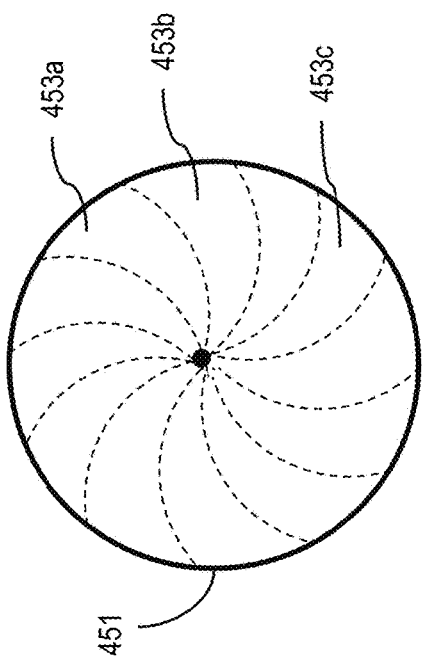
FIG. 4D

METHODS AND APPARATUS FOR PROVIDING COLOR PALETTE MANAGEMENT WITHIN A GRAPHICAL USER INTERFACE

CROSS-REFERENCE TO RELATED APPLICATIONS

This application claims priority to U.S. Provisional Patent Application No. 61/717,016 entitled "Methods and Apparatus for Providing Color Palette Management within a Graphical User Interface", filed on Oct. 22, 2012, which is incorporated herein by reference in its entirety.

BACKGROUND

Some embodiments described herein relate generally to providing color palette management to users of electronic devices via graphical user interfaces of such electronic devices.

Color pickers and user interfaces for color palette management are available in various known software applications developed for user devices. Known color palette management services included within, for example, Microsoft Office, Adobe Photoshop and Keynote, typically solve a straightforward, but limited, task of picking one color from the entire range of the color space such as, for example, RGB (Red, Green, Blue) color model in which red, green, and blue light are added together in various ways to reproduce a broad array of colors. The bulk of known color pickers in known software applications use the HSV (Hue, Saturation, Value) representation of the RGB color model that is a cylindrical coordinate representation of points in a RGB model. This representation of the RGB model presents a slider for value (lightness) and a color wheel where the user can pick colors with a given value. Using a slider, however, does not allow a user to capture colors with high precision (e.g., capturing a color in between two colors).

Furthermore, known color palette management services typically have a preset number of color wells, each of which contains a color that can be selected using a color picker. This approach, however, does not provide a straightforward way to explore the relationships between colors in a palette, or a way to create new colors in the color palette by combining existing colors. In other words, in known color systems, it is exceedingly difficult to practice the approach employed by artists working in physical mediums, which involves blending colors together to create a harmonious palette. Therefore, a need exists for an approach to overcome the shortcomings of the existing methods by enabling the users to mix colors based on intuitive notions of color blending.

SUMMARY

In some embodiments, a method comprises receiving, from a user device, a first input indicating a first color as a source color. The source color is from a color palette representation displayed on a user interface associated with the user device. The method further comprises receiving, from the user device, a second input indicating a second color as a target color. The target color is from the color palette representation. The method also comprises receiving, from the user device, a plurality of user movement indicators representing an incremental mixing of the target color into the source color. The method further comprises defining a plurality of colors based on the source color, the target color and the plurality of user movement indicators. Each color from the plurality of colors is associated with at least one user movement indicator from the plurality of user movement indicators. The method also comprises storing, for each color from the plurality of colors, data associated with that color, the first input, the second input, and the at least one user movement indicator from the plurality of user movement indicators associated with that color. The method further comprises sending, for each color from the plurality of colors, a signal to display a representation of that color on the user interface associated with the user device.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 4A-4D are illustrations of sample display menus provided by the color palette management platform to a user of a user device, according to an embodiment.

DETAILED DESCRIPTION

Figure 1:
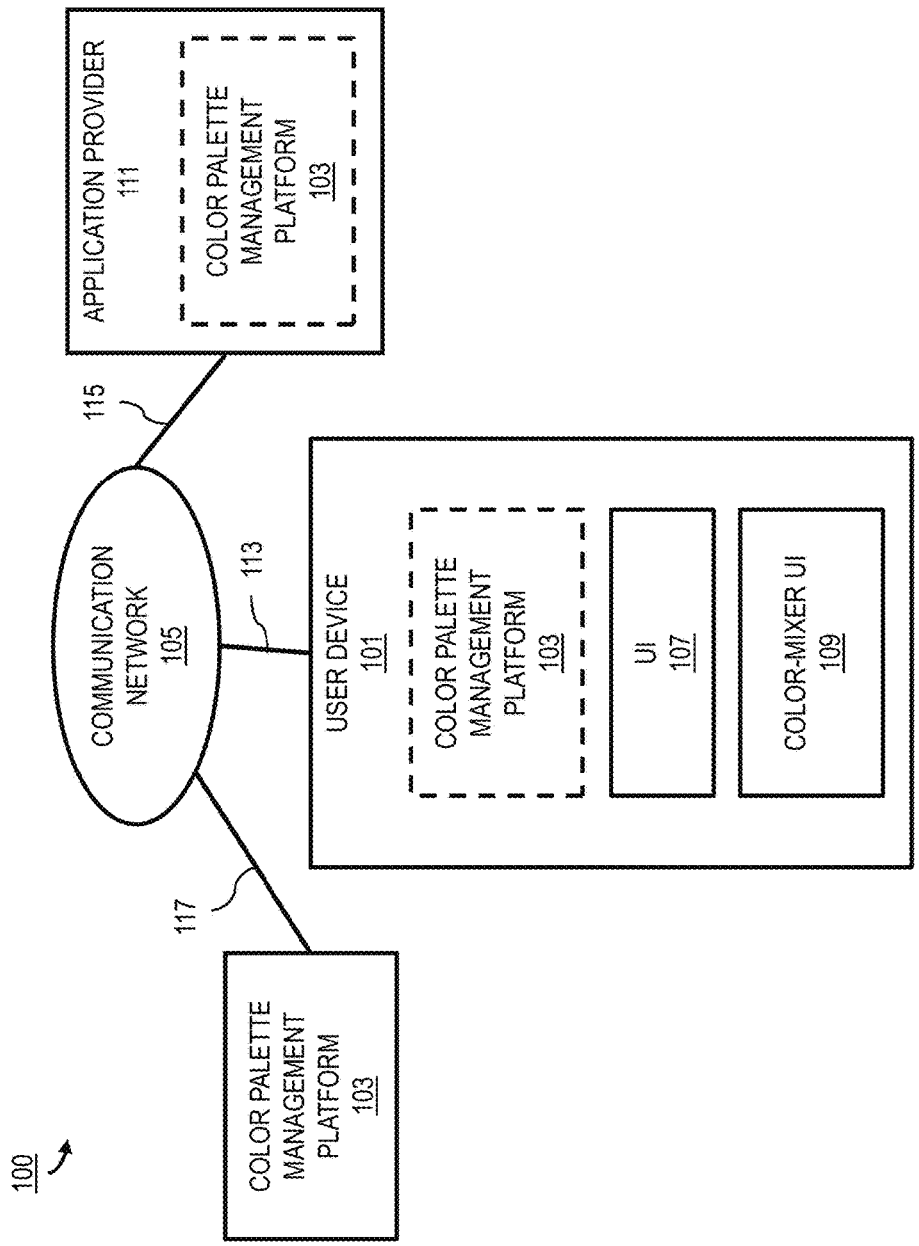
FIG. 1 is a schematic block diagram of a computer system in which color mixing functions can be embodied, according to an embodiment.

Known color picking and color palette management methods are difficult to use. The user of a color picking and palette management service on a user device typically has to select from a color range or color wheel and to manipulate sliders to achieve a desired color. The operations involved in selecting colors follow a color representation optimized for computers, rather than one that agrees with the analog and visceral behavior of colors. Furthermore, most of the existing interfaces are not conducive to the relatively low precision of touch-based user interfaces that come from working with real paints or pigments. For example, if a user is interested in two colors that are close to each other on a color wheel, lack of granularity of the color wheel can make finding a point between the two colors on the color wheel very difficult or even impossible. An additional challenge is that achieving a color with the desired properties typically involves a great deal of understanding of the underlying mathematical color model. Furthermore, the users are typically interested in creating a set of colors that visually work well together and not picking one color from a palette. Known color picking methods, however, typically provide predefined or standard color palettes for the users. These methods do not allow a user to define his/her own desired color palette. Therefore, a need exists for a platform to overcome the shortcomings of the existing methods by enabling the users to mix colors based on intuitive notion of color blending and to create their own color palette.

Methods and apparatus are described herein to provide color palette management within a graphical user interface of a user device. In some embodiments, a method comprises receiving, from a user device, a first input indicating a first color as a source color. The source color is from a color palette representation displayed on a user interface associated with the user device. The method further comprises receiving, from the user device, a second input indicating a second color. The target color is from the color palette representation. The method also comprises receiving, from the user device, a plurality of user movement indicators representing an incremental mixing of the target color into the source color. The method further comprises defining a plurality of colors based on the source color, the target color and the plurality of user movement indicators. Each color from the plurality of colors is associated with at least one user movement indicator from the plurality of user movement indicators. The method also comprises storing, for each color from the plurality of colors, data associated with that color, the first input, the second input, and the at least one user movement indicator from the plurality of user movement indicators associated with that color. The method further comprises sending, for each color from the plurality of colors, a signal to display a representation of that color on the user interface associated with the user device.

In some embodiments, an apparatus comprises a color-mixer module implemented in at least one of a memory or a processor device. The color mixer module is configured to receive, from a user device, a first input indicating a first color from a color palette representation displayed on a user interface of the user device, as a source color. The color-mixer module is configured to receive, from the user device, a second input indicating a second color from the color palette representation as a target color. The color-mixer module is configured to receive, from the user device, a plurality of user movement indicators representing an incremental mixing of the target color into the source color. The color-mixer module is configured to define a plurality of colors based on the first input, the second input and the plurality of user movement indicators, each color from the plurality of colors being associated with at least one user movement indicator from the plurality of user movement indicators. The apparatus also comprises a history module implemented in at least one of a memory or a processor device. The history module is configured to store, for each color from the plurality of colors, data associated with that color, the first input, the second input and the at least one user movement indicator from the plurality of user movement indicators for that color.

In some embodiments, a non-transitory processor-readable medium storing code representing instructions to be executed by a processor. The code comprises code to cause the processor to receive, from a user device, (1) a first input indicating a first color from a color palette representation as a first source color, (2) a second input indicating a second color from the color palette representation as a first target color, and (3) a first plurality of user movement indicators representing an incremental mixing of the first target color into the first source color. The processor is also caused to define a first plurality of colors based on the first source color, the first target color and the first plurality of user movement indicators. Each color from the first plurality of colors is associated with a user movement indictor from the first plurality of user movement indicators. The processor is also caused to receive, from the user device, a second plurality of user movement indicators representing a decremental mixing of the target color into the source color. The processor is also caused to define a second plurality of colors based on the first plurality of colors and the second plurality of user movement indicators. Each color from the second plurality of colors is associated with a user movement indicator from the second plurality of user movement indicators, the second plurality of colors being in an inverse order of the first plurality of colors. The processor is also caused to send a signal to display a representation of each color from the second plurality of colors on a user interface associated with the user device.

In some embodiments, a method comprises receiving at least one color from a user device. The method further comprises defining a color palette based on the at least one color. The method also comprises displaying the color palette on a user interface of the user device, where a user of the user device can select at least one color from the color palette using an input device of the user device.

In some embodiments, a color palette management platform provides a color-mixer user interface on a user device to enable a user to perform color blending on the user device. In addition, a palette user interface is also provided that enables the user to manage one or more color palettes by defining, modifying, removing, or saving color palettes and/or the color samples within each color palette. The user is also enabled to merge multiple color palettes into one or split one color palettes into multiple color palettes. The defined colors are produced by blending colors in novel combinations unlike selecting each color individually using a traditional color picker.

In some embodiments, the color-mixer user interface is a touch-based user interface of color mixing. The user can mix colors by touching a source color on a palette and touching a target color to be mixed with the source color.

In some embodiments, the color-mixer user interface enables the user to mix between two colors of choice that are not the primary colors. The source colors for the mixing can be selected from a palette previously defined by the user or by other users, from a set of primary colors and black and white, or from a traditional color picker.

In some embodiments, the color-mixer user interface enables the user to reverse the color mixing. For example, if the user would like to eliminate the last color that he/she added to the mix (e.g., too much white was added) he/she can un-mix the last color. The reversible color mixing enables the user to un-mix multiple layers of added colors and eventually retrieve the very first source color used for mixing.

In some embodiments, the color palette management platform stores color mixing history in a memory associated with the user device. The color palette management platform enables the user to replay the history, track backward or forward into the layers of color mixing of the history and select any layer as a current source or target color.

In some embodiments, the color-mixer user interface enables the user to drag-and-drop user interface content or drag-and-drop colors to and from a palette, the color-mixer, etc. for palette management.

As used herein, "user" can be a person, a module, a device, or an application. In some of the embodiments discussed, a user is referred to as a person using the user device via one or more user interfaces. Additionally/alternatively, a user can be a device, a module of a device, or an application such as, for example, art applications, computer games, simulation applications, etc., that can use the color palettes provided and managed by the described methods and apparatus.

As used herein, the singular forms "a," "an" and "the" include plural referents unless the context clearly dictates otherwise. Thus, for example, the term "a "color palette" is intended to mean a single color palette or a combination of color palettes (e.g., color palettes defined by a user each for a family of colors including different tones of a certain color, etc.).

FIG. 1 is a schematic block diagram of a computer network system providing color palette management, and color mixing and blending, according to an embodiment. The computer network system 100 includes at least one user device 101, equipped with at least a User Interface (UI) 107; and a color-mixer UI 109. The computer network system 100 also includes a color palette management platform 103; and at least one application provider 111, which can be operatively coupled to one or more user devices 101 or other application providers via a communication network 105. Note that the color palette management platform 103 or some of its components can be embedded within the user device 101, or be external to the user device 101 and operatively coupled to one or more user devices 101 or one or more application providers 111 via a communication network 105. Any of the devices or platforms of the computer network system 100 can be equipped with local memory/storage spaces (not shown in FIG. 1). Furthermore, the devices and platforms of the system 100 may have access to centralized or distributed memory/storage spaces (not shown in FIG. 1) through the communication network 105. Thus, FIG. 1 is merely an example illustrating the types of devices and platforms that can be included within a computer network system 100.

Communication network 105 can be any communication network, such as the Internet, configurable to allow the user device 101, the color palette management platform 103, and the application provider 111 to communicate with communication network 105 and/or to each other through communication network 105. Communication network 105 can be any network or combination of networks capable of transmitting information (e.g., data and/or signals) and can include, for example, a telephone network, an Ethernet network, a fiber-optic network, a wireless network, and/or a cellular network.

In some instances, communication network 105 can include multiple networks operatively coupled to one another by, for example, network bridges, routers, switches and/or gateways. For example, the user device 101 can be operatively coupled to a cellular network; the application provider 111 and/or the color palette management platform 103 can be operatively coupled to a fiber-optic network. The cellular network and fiber-optic network can each be operatively coupled to one another via one or more network bridges, routers, switches, and/or gateways such that the cellular network, the Ethernet network and the fiber-optic network are operatively coupled to form a communication network. Alternatively, the cellular network and fiber-optic network can each be operatively coupled to one another via one or more additional networks. For example, the cellular network and the fiber-optic network can each be operatively coupled to the Internet such that the cellular network, the fiber-optic network and the Internet are operatively coupled to form a communication network.

As illustrated in FIG. 1, the user device 101 is operatively coupled to communication network 105 via network connection(s) 113; application provider 111 is operatively coupled to communication network 105 via network connection(s) 115; and the color palette management platform 103 is operatively coupled to communication network 105 via network connection(s) 117. Network connections 113, 115, and 117 can be any appropriate network connection for operatively coupling user device 101, application provider 111, and the color palette management platform 103.

A network connection can be a wireless network connection such as, for example, a wireless fidelity ("Wi-Fi") or wireless local area network ("WLAN") connection, a wireless wide area network ("WWAN") connection, and/or a cellular connection. A network connection can be a wired connection such as, for example, an Ethernet connection, a digital subscription line ("DSL") connection, a broadband coaxial connection, and/or a fiber-optic connection.

As mentioned above, in some instances, a computer network system 100 can include more than one user device 101, more than one color palette management platform 103, and more than one application provider 111. A user device 101, a color palette management platform 103, and/or an application provider device 111, can be operatively coupled to the communication network 105 by heterogeneous network connections. For example, a first user device 101 can be operatively coupled to the communication network 105 by a WWAN network connection, another user device 101 can be operatively coupled to the communication network 105 by a DSL network connection, and a color palette management platform 103 can be operatively coupled to the communication network 105 by a fiber-optic network connection. The application provider 111 can be, for example, a web server configured to provide various applications to electronic devices, such as user device 101.

The user device 101 can be any of a variety of electronic devices that can be operatively coupled to communication network 105. A user device 101 can be a personal computer, a tablet computer, a personal digital assistant (PDA), a cellular telephone, a portable/mobile internet device and/or some other electronic communication device. The user device 101 can include a web browser configured to access a webpage or website hosted on or accessible via the application provider 111 over communication network 105. The user device 101 can be configured to support, for example, HTML using JavaScript. For example, the user device 101 can include a web browser, such as, Firefox, Safari, Dolphin, Opera and Chrome. An Internet page or website can be accessed by a user of a web browser at a user device 101 by providing the web browser with a reference such as a uniform resource locator (URL), for example, of a webpage. For example, a user of a user device 101 can access an application provider device 111 via a URL designated for the application provider device 111. In some instances, user device 101 can include specialized software for accessing a web server other than a browser, such as, for example, a specialized network-enabled application or program. In some instances, portions of a website accessible via a web server can be located in a local or remote memory space/data store accessible to the web server. A data store can be at least one of a database, a data warehouse, or a file. A user device 101 can also include a display, monitor or user interface (UI) 107, a keyboard, various ports (e.g., a USB port), and other user interface features, such as, for example, digital pens, mice, touch screen controls, audio components, and/or video components (each not shown). A user device 101 can be operatively coupled to communication network 105 via the UI 107 and network connection 113.

Figure 2:
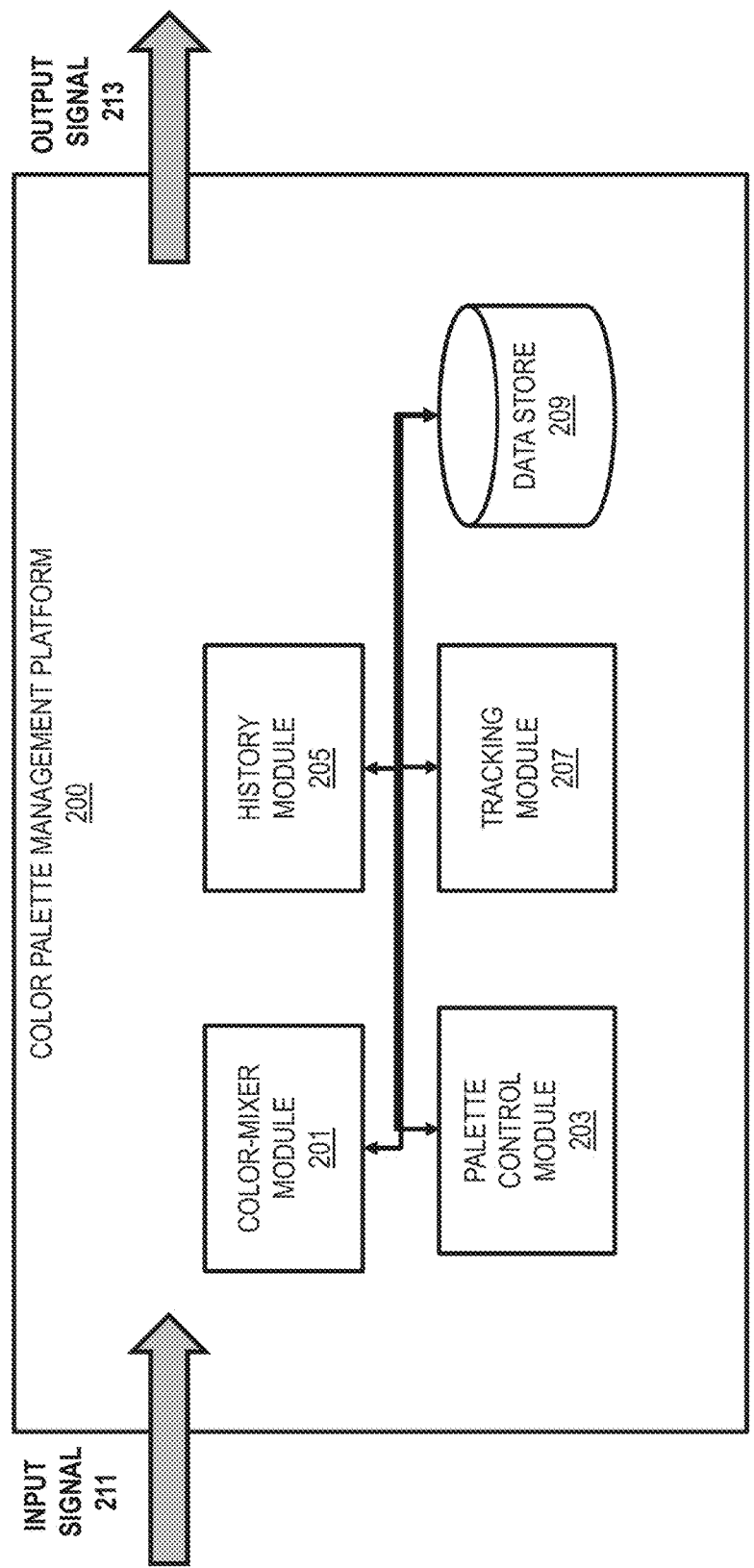
FIG. 2 is a schematic illustration of a color palette management platform, according to an embodiment.

FIG. 2 is a schematic illustration of a color palette management platform, according to an embodiment. Color palette management platform 200 can be similar to the color palette management platform 103 of FIG. 1. As shown in FIG. 2, a color palette management platform 200 can include a color-mixer module 201, a palette control module 203, a history module 205, a tracking module 207, and a data store 209. Furthermore, the color palette management platform 200 can communicate with other components of a computer network system (e.g., computer network system 100 of FIG. 1) via input signal 211 and output signal 213.

In various instances, the color palette management platform 200 and its components can be located anywhere within a communication network system 100 such as that shown in FIG. 1 including, but not limited to, within the user device 101, within the application provider 111, or in separate locations within the communication network system 100 of FIG. 1.

As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

The color palette management platform 200 can provide color palette management and reversible color mixing on a user device 101 via a color-mixer UI 109. In some instances, the color-mixer module 201 blends two active colors, referred to here as the source and the target colors and provides (or presents) the resulting product to the user of user device 101 through an output signal 213, and via the color-mixer UI 109. At any point, the current color, which is a product of the color-mixer module 201, can either be directly used by a user of the user device 101 in an application provided by the service provider 111, for example, as the color for a drawing operation, or as a new source color to be used by the color-mixer module 201 for further color mixing. Additionally/alternatively, a current color can be saved by the palette control module 203 into an existing or a new color palette, for example in data store 209, for future use. Additionally, the history module 205 can record a history of colors produced by the user via the color-mixer module 201, color palettes produced by the user via the palette control module 203, or any other processes/products of the color palette management platform 200 in the data store 209. The history module 205 can record detailed information about the order in which the colors were produced, the time and date they were produced, user information, etc., for future retrieval of the history when requested by a user. The information associated with colors, color palettes, history, etc., can be stored in locations other than data store 209, for example, on storages accessible to the user device 101 via the communication network 105.

In some instances the user of a user device 101 can rewind (reverse) the history of the color mixing to achieve a color that was mixed in the past. The rewinding process can be provided by the tracking module 207 using the history recorded by the history module 205. This allows for fine tuning of the desired color as the user explores related colors in the color mixing history. The color palette management platform 200 enables the user of the user device 101 to achieve a desired color by applying an intuitive, perceptual, physical experience, without a need to use color wheels or sliders. For example, if the user would like to have a dark red color, he/she can use the color-mixer UI 109 to mix black as target into red as source. If he/she would like to have green, he/she can mix blue as target into yellow as source, etc. Any of the intermediate colors produced by the color-mixer module 201 based on user request via the color-mixer UI 109 can be stored away in a color palette by the palette control module 203 and can be used as departure points (e.g., source or target colors) for further mixing. The colors that are brought together by the color-mixer module 201 using a shared mixing history recorded by the history module 205 produce a level of richness and harmony that would typically involve expert level color knowledge to achieve with a traditional color picker.

In some instances, the color-mixer UI 109 provides services also provided by the color palette management platform 200 to the user of the user device 101. For example, the color-mixer UI 109 enables the user to adjust a ratio of aspects of the source and target colors such as brightness or darkness of each of the source or target colors. The color-mixer UI 109 also enables the user to rewind (reverse) the mixing history by activating the tracking module 207 to retrieve the history from the data store 209 or from other storage locations. Furthermore, the color-mixer UI 109 enables the user to display the current color, set a new target color, set a new source color, etc.

Figure 3:
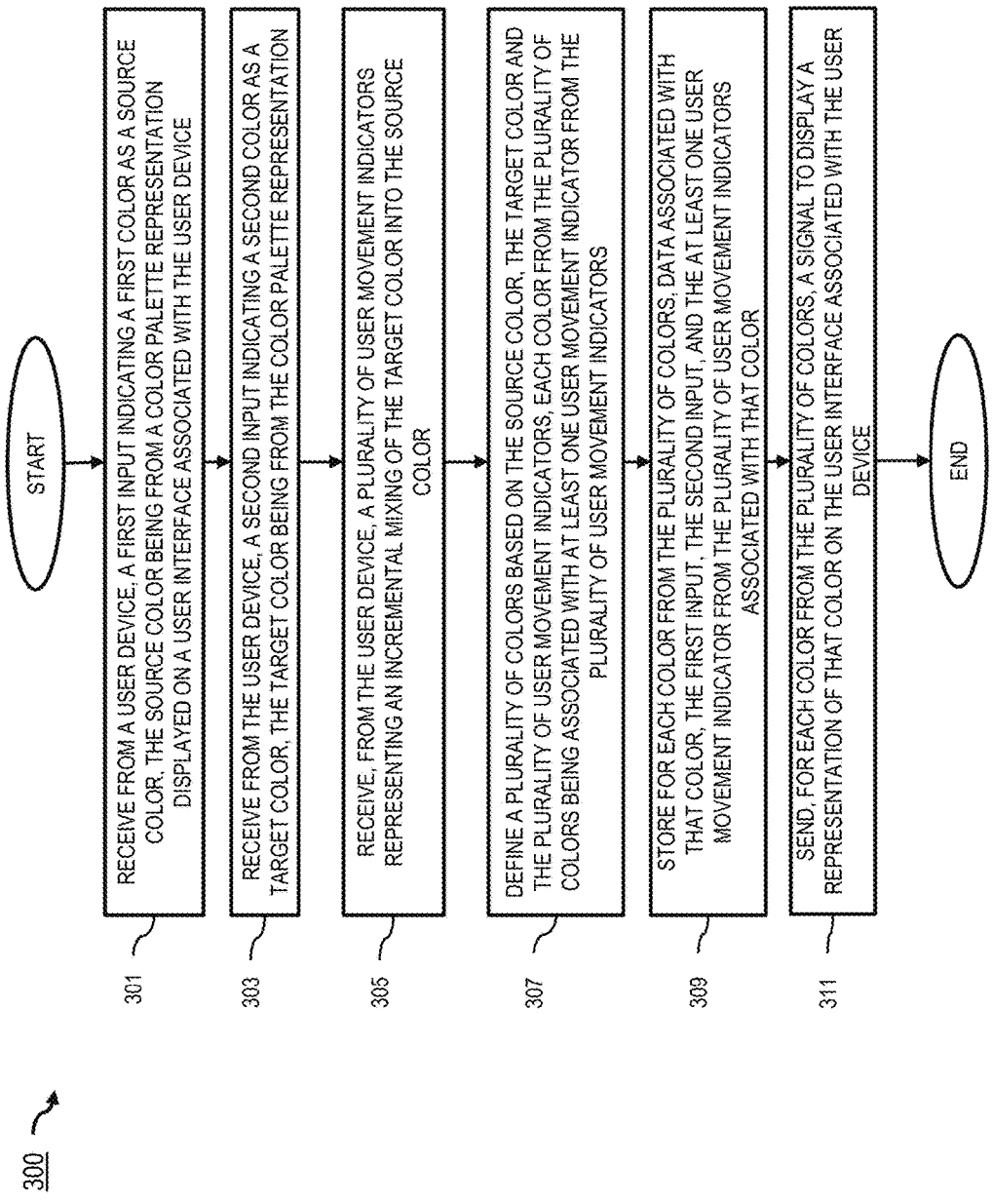
FIG. 3 is a flowchart of a process of color palette management, according to an embodiment.

FIG. 3 is a flowchart of a process of color palette management, according to an embodiment. At 301, the color palette management platform 200 receives (e.g., via an input signal 211) a first input from a user device 101, for example via a color-mixer UI 109. The first input can indicate a first color from a color palette representation as a source color. The color palette representation can be provided to the user device via the color-mixer UI 109 by the palette control module 203. The color palette representation can be a standard palette retrieved from the data store 209. The color palette representation can also be previously defined by a user of the user device 101 or by one or more users of one or more other user devices 101 and stored at the data store 209. Alternatively, the palette control module 203 can define one or more color palette representations from combination of standard color palette representations (e.g., provided as default) and color palettes defined by users of user devices 101. The first input can be stored at a data store 209.

At 303, the color palette management platform 200 receives (e.g., via an input signal 211) a second input from the user device 101, for example via a color-mixer UI 109. The second input can indicate a second color from the color palette representation as a target color. The second input can be stored at a data store 209.

At 305, the color palette management platform 200 receives (e.g., via an input signal 211) from the user device 101, a plurality of user movement indicators representing an incremental mixing of the target color into the source color, for example via a color-mixer UI 109. For example, the color-mixer UI 109 can provide a virtual finger-touch button on the screen of UI 107 such that the user can use for color mixing. For example, a circular movement of a finger in a clockwise direction can indicate incremental combination of the target color into the source color, while a counterclockwise movement can indicate a decremental combination of the target color into the source color. The plurality of user movement indicators can be stored at a data store 209.

At 307, the color-mix module 201 defines a plurality of colors based on the source color (e.g., the first input), the target color (e.g., the second input), and the plurality of user movement indicators. Each color from the plurality of colors can be associated with at least one user movement indicator from the plurality of user movement indicators. For example, every incremental or decremental combination of the target color into the source color, as discussed with regards to step 305, can produce a color defined by the color-mixer 201.

At 309, the history module 205 can store, for example, at a storage location in data store 209 associated with the user device 101 or at other memory locations accessible by the color palette management platform 200 via the communication network 105, data associated with each color, and the associated first input, second input, and the at least one user movement indicator from the plurality of user movement indicators for that color.

At 311, the color palette management module 200 sends a signal to display a presentation of each color from the plurality of colors on a color-mixer UI 109 associated with the user device 101.

In some instances, the stored indicators can be used by the tracking module 207 to track the color-mix process forward or backward and present layers of combined colors to a user device 101, for example via an output signal 213. This enables a user of the user device 101 to reproduce layers of mixed colors from combinations of source color and target color and produce new color combinations based on previously produced color combinations.

FIGS. 4A-4D are illustrations of sample display menus provided by the color palette management platform to a user of a user device, according to an embodiment. Note that the color palette management platform 200 can enable a user of the user device to enter input by various movements via an input device or a touch screen. User input is received by the color palette management platform 200 via the input signal 211 as indicators representing desired color mixing/unmixing. In the examples of FIGS. 4A-4D, the user 401 is a person using a touch screen and user movements include turning a circular graphical indicator in clockwise, to mix, or counterclockwise, to unmix, selected colors. In various instances, various indicators, and movements can be defined by the color palette management platform 200, or by a user.

Figure 4A:
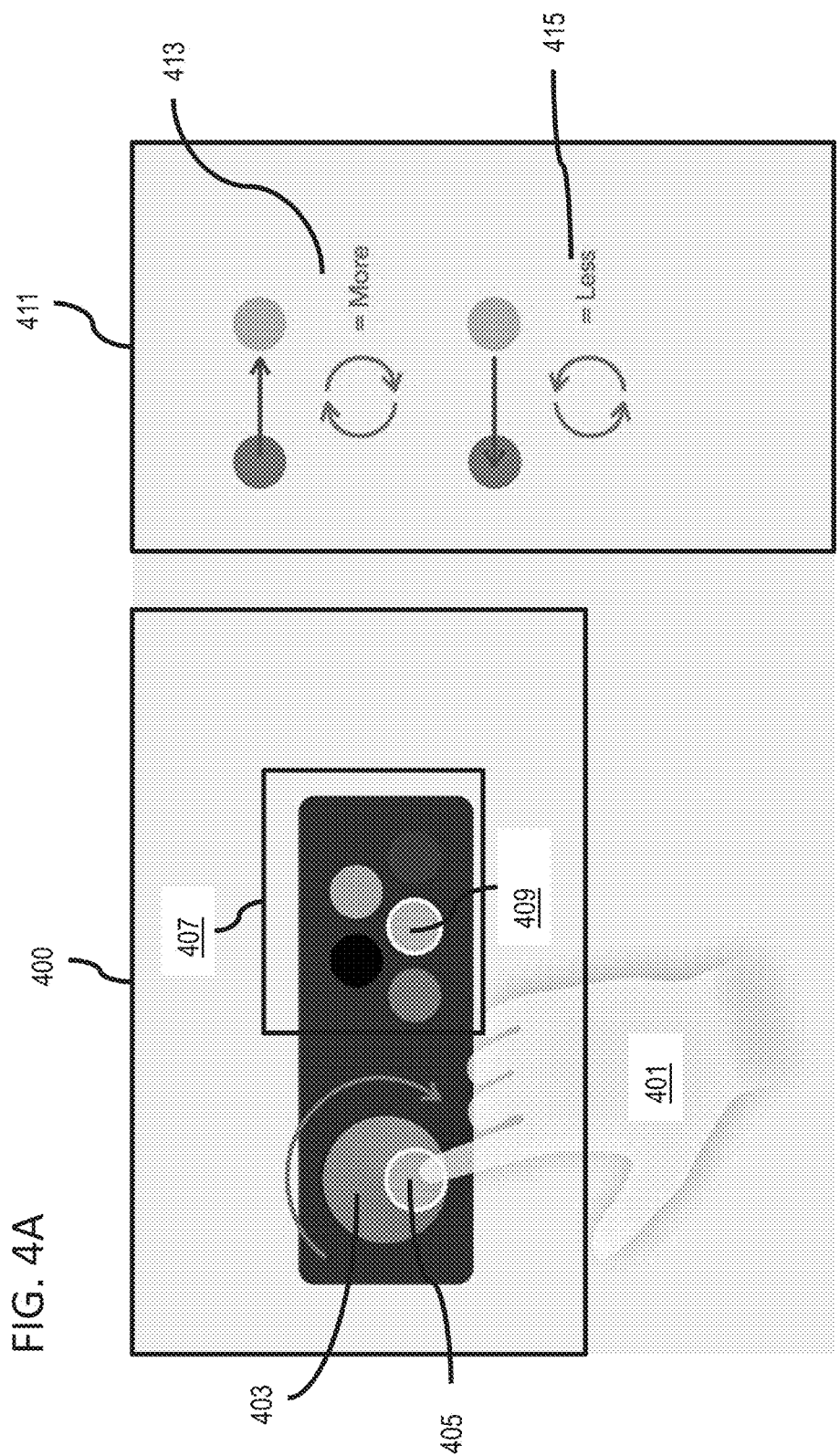

In some instances, the color-mixer UI 109 can be coupled with various input and output devices such as, for example, a digital pen, a mouse, a touch-based screen, etc. As displayed in FIGS. 4A-4C, the color-mixer UI 400 (similar to the color-mixer UI 109 of FIG. 1) includes a display region representing a graphical indicator 403 in a circular shaped well of color that shows at least a portion of the history of the color mixing process in a linear gradient that is wrapped around the center of the graphical indicator. The graphical indicator 451 of FIG. 4D shows counterclockwise gradient sections of the mixer 403 and the graphical indicator 455 of FIG. 4D shows clockwise gradient sections of the mixer 403. For example as shown in the graphical indicators 451, the dotted sections of circle 451 indicated as 453*a*, 453*b*, 453*c*, etc. represent at least a portion of the history of color mixing process in which each adjacent section (e.g., 453*a*) is the previous historical blend of its clockwise neighbor (e.g., section 457*b*) produced from combination of a source color and a target color. Similarly, in the graphical indicator 455, each adjacent section represents the next historical blend of its counterclockwise neighbor. For example, section 453*c* is the next blend to section 453*b*. At any time during the color mixing process, the current color is indicated by the graphical indicator 405 of FIG. 4A.

In some instances, the palette control module 203 enables the user to select a color palette 407 to perform color mixing based on the colors in the color palette. The color-mixer UI 400 enables the user to drag a source color from palette 407 and drop the source color in mixer 403 as a source graphical indicator. The user can then drag a target color 409 from palette 407 and drop the target color in the graphical indicator 405 as a target graphical indicator. When the user moves the graphical indicator 405 inside mixer 403 in clockwise direction (shown in guide 411 as 413), for example by using a mouse, a digital pen or by finger on a touch screen display, the mix of the source color and the target color is presented on the display of the user device by the color-mixer module 201. The history module 205 stores a history of color mixing by the color-mixer module 201 including the current color and the user input (e.g., movement). At any time, the current color blend is presented in the graphical indicator 405 by the color-mixer module 201. Furthermore, user can input a movement indicating user's desire to retrieve the stored history. The color-mixer UI 400 presents at least part of the color mixing history provided by the history module 205 in mixer 403 in a linear gradient wrapped around the center, as previously discussed with respect to graphical indicators 451 and 455 of FIG. 4D. If the user moves the graphical indicator 405 in a counterclockwise direction (shown in guide 411 as 415), the tracking module 207 is activated and replaces the current color 405 with its historically previous blends. In other words, the tracking module 207 sends a signal to the color-mixer UI 400 to present the new current color in the graphical indicator 405. Note that guide 411 is not part of the color-mixer UI 400 and can be either present at a separate location or not present.

Furthermore, the color palette 407 includes the color palettes selected by the user to be used during color mixing process, for example as source color or target color. Additionally, the user is enabled to add the current color 405 to the color palette 407, for example as color 409, for further use.

In some instances, as seen in FIG. 4A, if a user 401 of the color-mixer UI 109 drags the graphical indicator 405 radially around the center of the mixer 403 in clockwise direction, the current color or graphical indicator 405 approaches the target color based on the color mixing by the color-mixer 201, and is blended on top of the existing history, in the new radial location of the user input. The graphical indicator 405 presents the current color, while the remaining sections of mixer 403 (represented as 455 in FIG. 4D) show most recent colors resulting from the color mixing process by the color-mixer module 201 before approaching the current color 405. When the user drags the graphical indicator 405 radially around the mixer 403 in the opposite direction (represented as 451 in FIG. 4D), counterclockwise, the history of the mixer 403 is replayed (reversed) by the tracking module 207 and presented by the color-mixer UI 400. The tracking module 207 replays the history as the current color by, temporarily, replacing source color as the target and the target color as the source. This allows the user to return to colors in the history that the mixer 403 is displaying to achieve a desired color. After presentation of the history, the tracking module 207 can switch the source and target colors back into their initial setup.

In some instances, the radial blending of colors as seen in the graphical indicators 451 and 455 of FIG. 4D, as opposed to a linear slider, enables the color-mixer module 201 to vary the rate at which blending occurs as a non-linear function of the radius of the graphical indicators 451 or 455. This can allow the user to finely control the color mixing compared to a slider on touch-based devices where screen size and touch-based input limits the precision of slider adjustment.

Figure 4B:
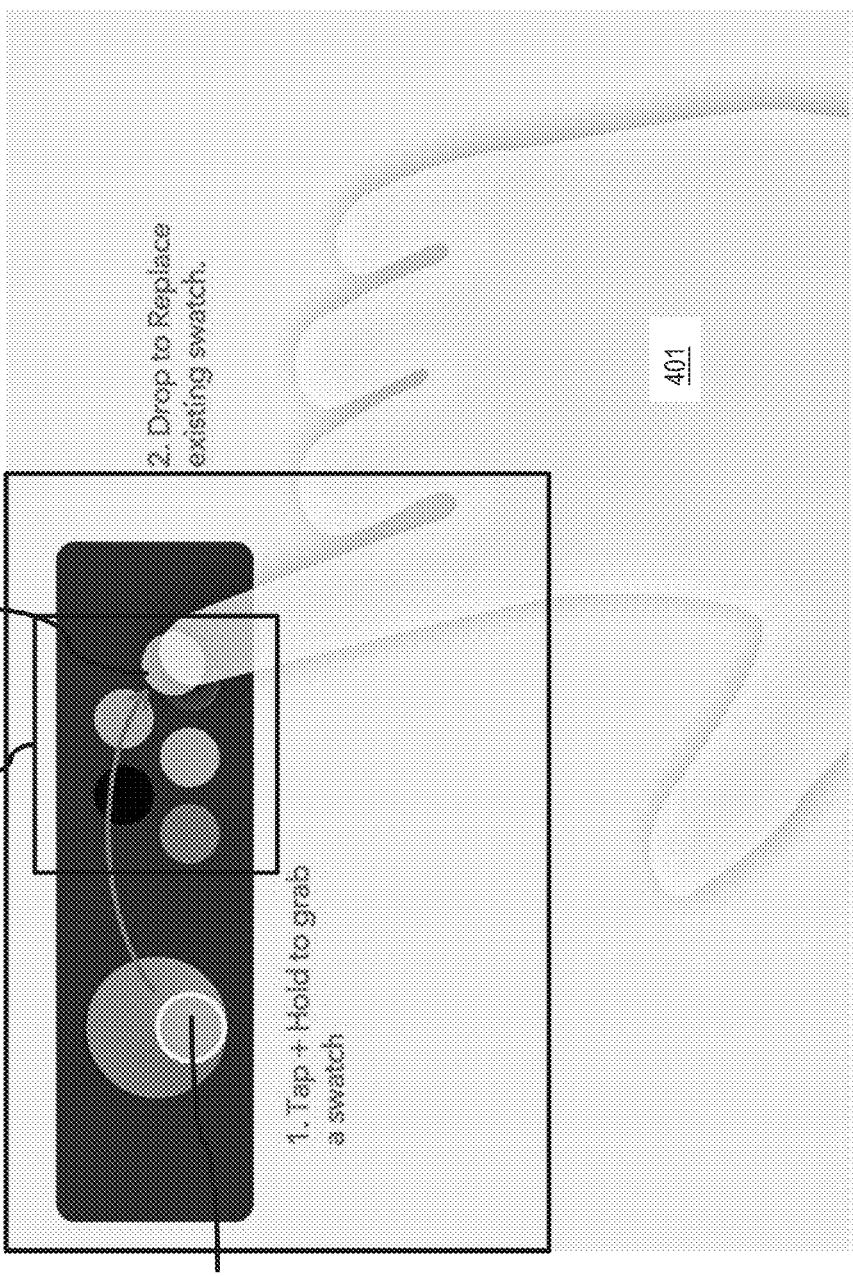

FIG. 4B is a sample display provided by the color palette management platform 200 to a user 401 for color mixing, according to an embodiment. FIG. 4B shows selection of a current color 421 (e.g., dragging the graphical indicator 421) and adding the selected current color 421 to the color palette 425 (e.g., dropping the graphical indicator 421 in the color palette 425) as a new color 423 of the color palette 425. For example, the user can tap the current color 421 in the mixer to select the current color 421 and drag and drop it into an existing color palette 425. In some instances, selection of the current color 421 by the user and dropping the selected color into the color palette 425 activates the palette control module 203 and the palette control module 203 updates the color palette data in the data store 209 by adding the color 421 to the color palette.

The user can either add the current color 421 to the color palette 425 as a new color 423, or overwrite one of the existing colors in the color palette by dropping the current color on the existing color in the color palette 425. The new color 423 can be used by the user as a source color or a target color for further color mixing.

In some instances, the color palette management platform 200 enables the user to select a new target color using a traditional color picker (e.g., HSV). Furthermore, if the user would like to start a color mixing operation with a different source color, the new source color can be selected using a traditional color picker. Alternatively, the user can drag an existing color from the color palette 421.

Figure 4C:
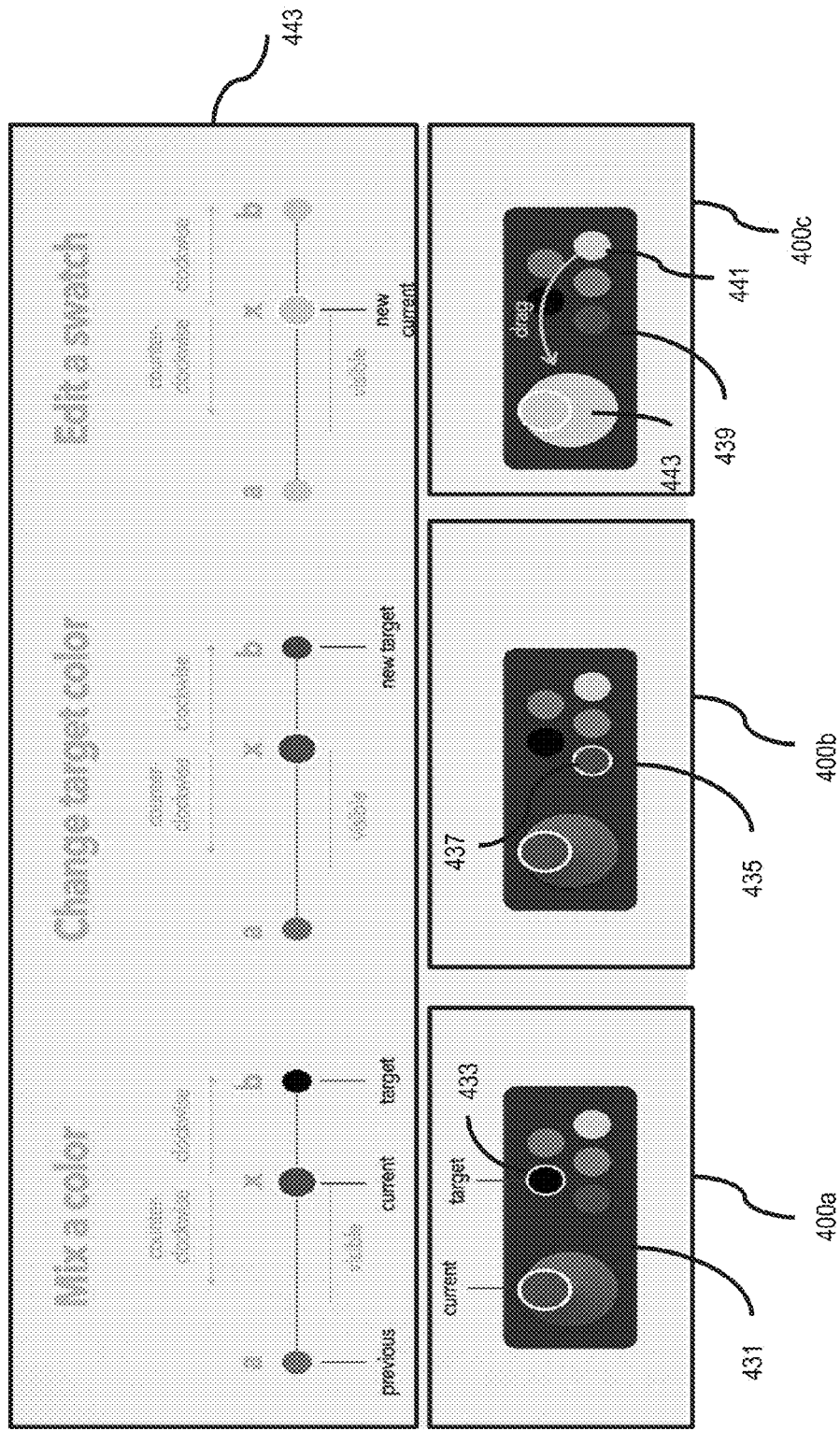

FIG. 4C demonstrates selecting source and target colors from a color palette based on user actions, according to one embodiment. The top portion 443 of FIG. 4C represents three user action, while the bottom portion represents three samples of the color-mixer UI 400 provided by the color palette management platform 200 based on the user actions 443. In some instances, the color-mixer UI 400 provides rapid setting of source and target colors and enables the user to use the mixing product as a source color for a future blending. The color palette management platform 200 enables the user to explore a multi-dimensional color gamut via a collection of one-dimensional explorations by setting a source color, setting a target color and radially mixing the source and target colors. This dimensional color reduction along the radials of a graphical indicator, as seen in the graphical indicators 451 and 455 of FIG. 4D allows the user to focus on a result color he/she wishes to achieve instead of being overwhelmed by the intermediate colors produced during the mixing process. As shown in the first panel 400a of FIG. 4C, the user can select color graphical indicator 433 of display 431 on the color-mixer 400 as the target color. As shown in the second panel 400b of FIG. 4C, the user can later select graphical indicator 437 as the target color to replace a previous target color 433. Similarly, as shown in the third panel 400c of FIG. 4C, after mixing the target color 437 into the source color, the user can select color 441 as the new target color by dragging and dropping it into the graphical indicator representing the source color.

As seen in panel 443 of FIG. 4C, upon selection of color 433 by the user as a new target color, the color-mixer module 201 indicates the color 433 as target. Selection of color 435 by the user as target color, shown in panel 400b, causes the color-mixer module 201 to replace the target color with the new target color 435. Panel 43c shows selection of a new source and a new target color by the user when the user drags color 441 and drops it in mixer 443. This selection by the user causes the color-mixer module 201 to update the colors as shown in panel 443.

Figure 5:
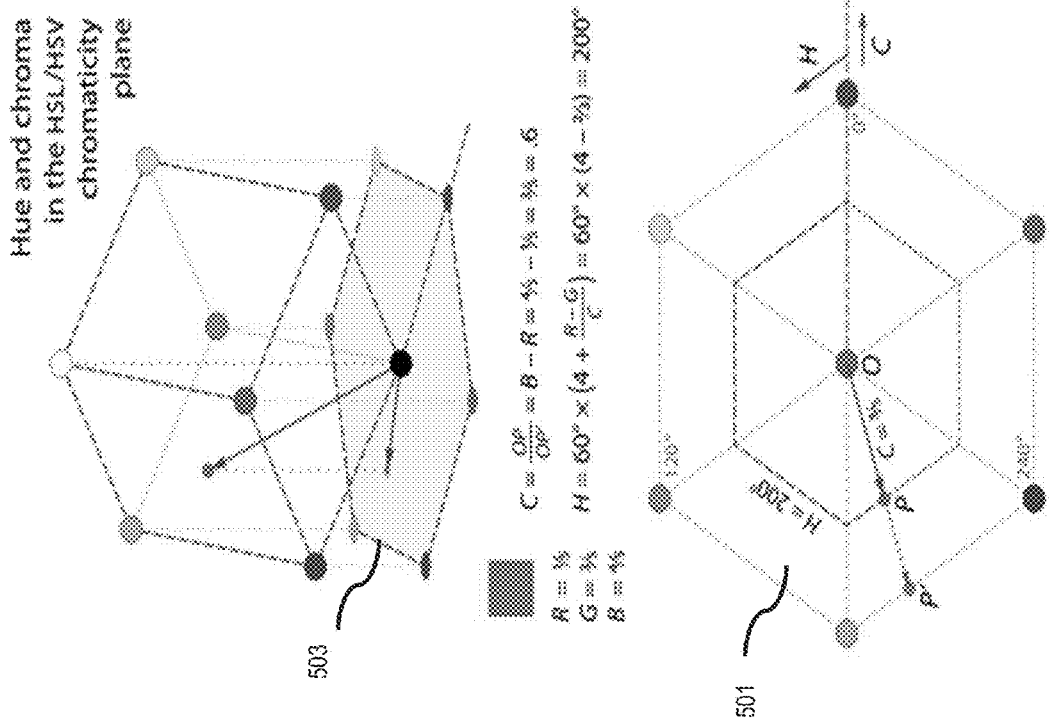
FIG. 5 is a diagram of using hue and chroma in HSL-HSV color model, according to an embodiment.

FIG. 5 is a diagram of using hue and chroma in HSL-HSV color model, according to an embodiment. Various color blending methods can be used by the color-mixer module 201 for blending a source and a target color. In some instances, the color-mixer module 201 interpolates between the two colors in a well-established color space, such as, for example, RGB, HSV, or Lab Color Space (CIELAB), which is a perceptual color space based on the color opponent theory, which states that the human visual system interprets information about color by processing signals from cones and rods in an antagonistic manner.

In some instances, the color-mixer module 201 applies a color blending model inspired by the physical blending of pigments such as, for example, Kubelka-Munk theory of reflectance, which describes the color and translucency of colored materials.

In some instances, the color-mixer module 201 derives a new color space in which interpolation by hand-tuning transitions to achieving desired results, for example by blending from blue to yellow to produce green.

In some instances, to provide the user with intuitive, aesthetically pleasing results, the color-mixer module 201 can blend colors by a method as a combination of the well-established color spaces, color blending theories, and color transition methods.

In some instances the color-mixer module 201 tunes transition in hue when mixing between a source color and a target color. Hue is an attribute of a visual sensation according to which an area appears to be similar to one or more of the perceived colors red, yellow, green, and blue. While a given color space may perform this transition in a perceptually intuitive and aesthetically pleasing way for many pairs of colors, that color space will invariably have color pairs whose transitions may have neither of these properties. For example, blending between yellow and blue in RGB space will result in a gray tone. The color palette management platform 200 provides a tunable system for color blending that prioritizes the user's aesthetic perception of the blending.

In some instances, the color-mixer module 201 uses a Chroma-Hue Path Warping method for color blending where chroma is the colorfulness relative to the brightness of a similarly illuminated white. The Chroma-Hue Path Wrapping method is based on defining a simple two dimensional space, B(x,y), (shown as 501) in which the modules of the color palette management platform 200, can apply logical reasoning on the path traversed in the blending operation from one color to another. Several tuning strategies are used for adjusting the paths in this space in order to define the blending across the entire color gamut.

The first step towards constructing B(x,y) is to reduce the dimensionality of RGB, by factoring out the color lightness. Various ways exist to define the lightness of a color, such as for example, using an intensity function I(r, g, b). Intensity, which is the total amount of light passing through a particular area, is defined as the average value of the RGB color channels. The intensity function is geometrically well-behaved when compared with other metrics that consider minimum and maximum values over color channels. In the case where the RGB cube is rotated such that the observer is looking down the neutral axis (black, grey, white) (shown as 503) and is projected onto the so-called chromatic plane, all colors with a given intensity, I, lie on a plane that is perpendicular to the neutral axis and parallel with the chromatic plane. FIG. 5 shows the chromatic plane 501 relative to the RGB cube 503.

In some instances, when blending between two colors, the two colors have different color intensities, I_0 and I_1. If the blending function B(Cs, Ct, α), interpolates linearly in color intensity, where Cs is the source color, Ct is the target color, and α a fixed point in blending operation, then the intensity of the blending can be calculates as:

$$I(B(Cs,Ct,\alpha))=I(Cs)+[I(Ct)-I(Cs)]*\alpha$$

In other words, given a fixed point in the blending operation, α, the choice of colors is limited to only those colors with a specific intensity.

Figure 6:
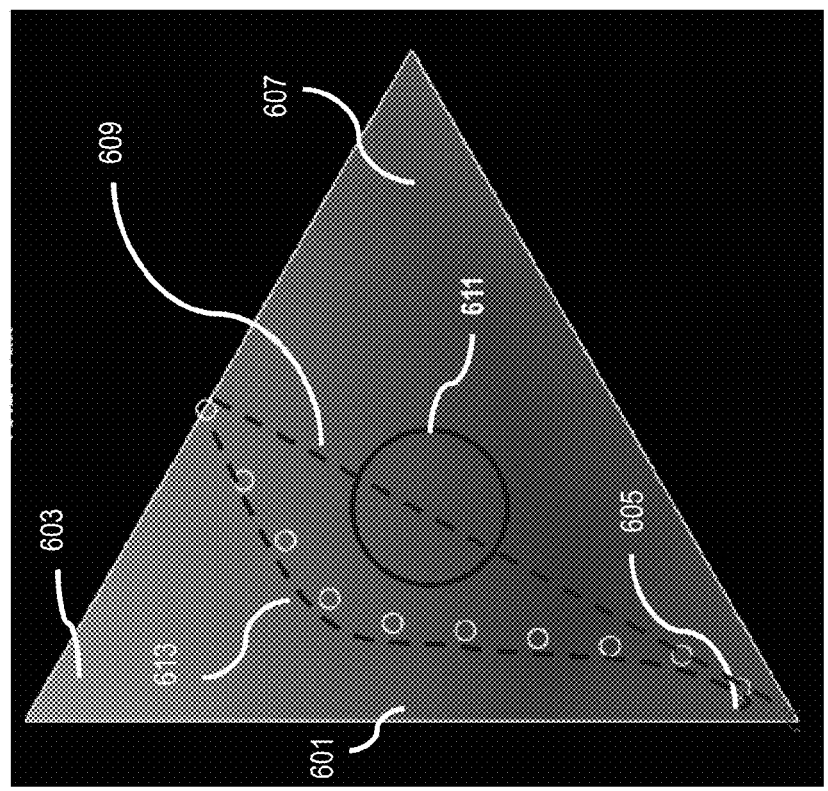
FIG. 6 is a diagram of using barycentric coordinates of a triangle in a color space, according to an embodiment.

FIG. 6 is a diagram of using barycentric coordinates of a triangle in a color space, according to an embodiment. If a fixed intensity for a point a in the interpolation is assumed, the space of possible colors is reduced to a plane that is parallel to the chromatic plane. Those colors vary in their hue and their chroma. The color-mixer module 201 can use a convenient two dimensional space in which it can efficiently apply logical reasoning on the hue and chroma. Such a space can be found with the use of barycentric coordinates of a triangle, where barycentric coordinates are non-rotating coordinates with origin at the center of mass of two or more bodies. As shown in FIG. 6, by mapping barycentric coordinates to RGB coordinates, the triangle 601 contains all colors with intensity I and the corners of the triangle correspond to pure green 603, pure blue 605, and pure red 607. In the triangular space 601, traversing a linear path in the three dimensional RGB cube corresponds to a linear path in the two dimensional space, when the color intensity is factored out and only hue and chroma are considered. In the barycentric coordinate space, it is possible to apply logical reasoning on modifications of blending paths between colors in terms of the hue and chroma. As shown in FIG. 6, the straight line 609 from yellow to blue traverses grey in RGB (shown by the graphical indicator 611). The curve 613, however, can be transformed in the two dimensional space to take a detour through green (while avoiding gray), as the user would expect from perceptual experience.

The method of FIG. 6 for producing a path 613 through the RGB color space traverses a range of hue, lightness, and chroma that is hand-tuned to be both perceptually intuitive and aesthetically appealing. When viewing the transition, however, human vision does not in all cases perceive the transition as being smooth and continuous. In addition, certain ranges of the colors, such as yellow, can be under-represented in the results despite being prevalent in how humans think about and perceive color. This is because the RGB color space, while being a natural way to describe colors from the perspective of a UI 109 of a user device 101 (such as a computer), was not designed to capture the nuances of human color perception. So-called perceptual color spaces, such as for example CIELAB, were designed with this property in mind, but are typically difficult to work with due to their mathematical and computational complexity.

The perceptual color space, the color space as processed by human brain, is not as evenly spaced as the RGB wheel. To provide a more natural experience for a user when mixing colors, the RGB path can be modified by gradients (e.g., normalized) such that the rate in which colors in the wheel change more closely replicates natural human perception. In some instances, the color-mixer module 201 after performing tuning, path construction, and interpolation for color mixing in RGB, normalizes the results based on a perceptual color space such as CIELAB. The color-mixer module 201 determines increments in the RGB path that correspond to a fixed increment in the perpetual color space according to an appropriate metric such as, for example, Euclidean distance. The result is a color gradient that has maximum visual resolution and makes user's color selection easy. In standard color models such as, for example, the HSV model some colors such as yellow constitute a small region of the color wheel. In some instances, the color-mixer module 201 expands the region for each color to provide a wider region for a user to select from while reducing the regions of other colors.

It is intended that the methods and apparatus described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. A method, comprising:
   receiving, from a user device, a first input indicating a selection by a user of the user device of a first color as a source color, the source color being from a color palette representation displayed on a user interface associated with the user device;
   receiving, from the user device, a second input indicating a selection by the user of a second color as a target color, the target color being from the color palette representation;
   defining a plurality of colors based on the source color and the target color, each color from the plurality of colors comprising a different mixture between the source color and the target color, the plurality of colors incrementing between the source color and the target color;

displaying at least a portion of the plurality of colors in a graphical indicator;

displaying a single current color at a time in a virtual color well within the graphical indicator, the virtual color well configured for use in applying the single current color to a document in a drawing computer application, the single current color comprising one of the source color, the target color, or one of the plurality of colors;

incrementing the single current color displayed in the virtual color well through the plurality of colors towards the target color responsive to a first user movement indicator detected by the user device; and incrementing the single current color displayed in the virtual color well through the plurality of colors towards the source color responsive to a second user movement indicator detected by the user device;

wherein the first user movement indicator includes an indicator of a first movement, by the user, of the virtual color well itself within the graphical indicator, and the second movement indicator includes an indicator of a second movement, by the user, of the virtual color well itself within the graphical indicator.

2. The method of claim 1, wherein:

incrementing the single current color displayed in the virtual color well towards the target color responsive to a first user movement indicator comprises incrementing the single current color towards the target color responsive to detecting the user of the user device rotating the virtual color well in a first rotational direction within the graphical indicator around an outside perimeter of the graphical indicator; and incrementing the single current color displayed in the virtual color well towards the source color responsive to a second user movement indicator comprises incrementing the single current color towards the source color responsive to the user rotating the virtual color well in a second rotational direction opposite the first rotational direction within the graphical indicator around the outside perimeter of the graphical indicator.

3. The method of claim 1, wherein the color palette is a first color palette, the method further comprising:

receiving, from the user device, a third input indicating a third plurality of colors;

defining a second color palette representation based on the third plurality of colors; and sending a signal to display the second color palette representation on the user interface of the user device such that a user of the user device can select an input from the second color palette.

4. The method of claim 1, wherein:

the user interface includes a drag-and-drop function such that a user of the user device can drag and drop, from the color palette representation into the graphical indicator, the first input as the source color and the second input as the target color, the receiving the first input indicating the first color as the source color being in response to the use of the drag-and-drop function, the receiving the second input indicating the second color as the target color being in response to the use of the drag-and-drop function.

5. The method of claim 1, further comprising:

receiving, from the user device, an input indicating a color palette control; and modifying the color palette representation displayed on the user interface of the user device, based on the input.

6. The method of claim 1, wherein the color palette representation is a first color palette representation, the method further comprising:

receiving, from the user device, an input indicating a color palette control;

merging data associated with the first color palette representation with data associated with a second color palette representation based on the input to produce a third color palette representation; and sending a signal to display the third color palette representation on the user interface of the user device.

7. The method of claim 1, wherein the color palette representation is a first color palette representation, the method further comprising:

receiving, from the user device, an input indicating a color palette control; and splitting data associated with the first color palette representation into data associated with a second color palette representation and data associated with a third color palette representation based on the input; and sending a signal to display at least one of the second color palette representation or the third color palette representation on the user interface of the user device.

8. An apparatus, comprising:

circuitry including a memory and a processor device, the memory including computer-readable instructions stored thereon, the computer readable instructions configured to instruct the processor to execute instructions for a color mixer module and a history module, the color-mixer module configured to receive, from a user device, a first input indicating a selection by a user of the user device of a first color from a color palette representation displayed on a user interface of the user device, as a source color, the color-mixer module configured to receive, from the user device, a second input indicating a selection by the user of a second color from the color palette representation as a target color, the color-mixer module configured to:

define a plurality of colors based on the source color and the target color, each color from the plurality of colors comprising a different mixture between the source color and the target color, the plurality of colors incrementing chromatically between the source color and the target color along a perceptual color path, the perceptual color path differing from a straight-line color path on a red-green-blue color plane between the source color and the target color;

display, on a graphic user interface, a graphical indicator having at least a portion of the plurality of colors displayed therein;

display a virtual color well within the graphical indicator, the virtual color well including a single current color at at time displayed therein, the virtual color well configured for use in applying the single current color to a document in a drawing computer application, the single current color comprising one of the source color, the target color, or one of the plurality of colors;

increment single the current color displayed in the virtual color well through the plurality of colors towards the target color responsive to a first user movement indicator indicating a first movement, by the user, of the virtual color well itself within the graphical indicator; and increment the single current color displayed in the virtual color well through the plurality of colors towards the source color responsive to a second user movement indicator detected by the user device, the second user movement indicator indicating a second movement, by the user, of the virtual color well itself within the graphical indicator; and the history module implemented in at least one of a memory or a processor device, the history module configured to store, for each color from the plurality of colors, data associated with that color, the first input, and the second input.

9. The apparatus of claim 8, wherein the computer-readable instructions are also configured to instruct the processor to execute instructions for:

a palette control module configured to receive, from the user device, an input indicating a color palette control, the palette control module configured to modify the color palette representation displayed on the user interface of the user device, based on the input.

10. The apparatus of claim 8, wherein the color palette representation is a first color palette representation, the computer-readable instructions further configured to instruct the processor to execute instructions for:

a palette control module configured to receive, from the user device, an input indicating a color palette control, the palette control module configured to merge data associated with the first color palette representation with data associated with a second color palette representation based on the input to produce a third color palette representation, the palette control module configured to display the third color palette representation on the user interface of the user device.

11. The apparatus of claim 8, wherein the color palette representation is a first color palette representation, the computer-readable instructions further configured to instruct the processor to execute instructions for:

a palette control module configured to receive, from the user device, an input indicating a color palette control, the palette control module configured to split data associated with the first color palette representation into data associated with a second color palette representation and data associated with a third color palette representation based on the input, the palette control module configured to display at least one of the second color palette representation or the third color palette representation on the user interface of the user device.

12. The apparatus of claim 8, wherein:

the first user movement indicator comprises a detection of the user of the user device rotating the virtual color well within the graphical indicator in a first rotational direction around an outside perimeter of the graphical indicator; and the second user movement indicator comprises a detection of the user of the user device rotating the virtual color well within the graphical indicator in a second rotational direction opposite to the first rotational direction around the outside perimeter of the graphical indicator.

13. The apparatus of claim 12, wherein the graphical indicator is a circularly shaped graphical indicator.

14. The apparatus of claim 8, wherein the color-mixer module is configured to receive the first input, the second input, the first user movement indicator, and the second user movement indicator from the user device via at least one of a digital pen, a mouse, or a touch-based user interface.

15. A non-transitory processor-readable medium storing code representing instructions to be executed by a processor, the code comprising code to cause the processor to:

receive, from a user device, (1) a first input indicating a first color from a color palette representation as a first source color, and (2) a second input indicating a second color from the color palette representation as a first target color;

define a first plurality of colors based on the first source color and the first target color, each color from the first plurality of colors comprising a different mixture between the first source color and the first target color, the first plurality of colors incrementing between the first source color and the first target color;

display at least a portion of the plurality of colors in a graphical indicator;

display a single current color at a time in a virtual color well within the graphical indicator, the virtual color well configured for use in applying the single current color to a document in a drawing computer application, the single current color comprising one of the first source color, the first target color, or one of the first plurality of colors;

increment the single current color displayed in the virtual color well through the first plurality of colors towards the first target color responsive to a first user movement indicator detected by the user device; and increment the single current color displayed in the virtual color well through the first plurality of colors towards the first source color responsive to a second user movement indicator detected by the user device;

wherein the first user movement indicator includes an indicator of a first movement, by the user, of the virtual color well itself within the graphical indicator, and the second movement indicator includes an indicator of a second movement, by the user, of the virtual color well itself within the graphical indicator.

16. The non-transitory processor-readable medium of claim 15, wherein the color palette is a first color palette, the code further comprising code to cause the processor to:

receive, from the user device, a third input indicating a third plurality of colors;

define a second color palette representation based on the third plurality of colors; and send a signal to display a representation of the second color palette on the user interface of the user device such that a user of the user device can select an input from the second color palette.

17. The non-transitory processor-readable medium of claim 15, wherein:

the user interface includes a drag-and-drop function such that a user of the user device can drag and drop colors from the color palette representation into the graphical indicator.

18. The non-transitory processor-readable medium of claim 15, the code further comprising code to cause the processor to:

define a plurality of layers of colors based on the first plurality of colors; and send a signal to display at least a portion of the plurality of layers of colors within the color palette representation.

19. The non-transitory processor-readable medium of claim 15, wherein the first input and the second input are received from the user device via at least one of a digital pen, a mouse, or a touch-based user interface.

20. The method of claim 1, wherein defining the plurality of colors includes defining the plurality of colors chromatically between the source color and the target color along a perceptual color path, the perceptual color path differing from a straight-line color path on a red-green-blue color plane between the source color and the target color path.

* * * * *

UNITED STATES PATENT AND TRADEMARK OFFICE
CERTIFICATE OF CORRECTION

PATENT NO. : 9,563,972 B2  
APPLICATION NO. : 14/060101  
DATED : February 7, 2017  
INVENTOR(S) : Andrew S. Allen et al.

Page 1 of 1

It is certified that error appears in the above-identified patent and that said Letters Patent is hereby corrected as shown below:

Item (73); Assignee reads:  
"FifthyThree, Inc."

Which should read:  
"FiftyThree, Inc."

Signed and Sealed this  
Ninth Day of May, 2017

Michelle K. Lee  
*Director of the United States Patent and Trademark Office*